United States Patent
Takahashi et al.

[11] Patent Number: 6,016,763
[45] Date of Patent: Jan. 25, 2000

[54] SUBMERSIBLE UNIT AND DIVING POSITION CONTROL METHOD THEREFOR

[75] Inventors: Yoshiaki Takahashi, Tokyo; Tadashi O-oi, Yokohama, both of Japan

[73] Assignee: Ishikawajima-Harima Heavy Industries Co., Ltd., Tokyo, Japan

[21] Appl. No.: 09/000,189

[22] PCT Filed: Dec. 19, 1996

[86] PCT No.: PCT/JP96/03697

§ 371 Date: Jan. 2, 1998

§ 102(e) Date: Jan. 2, 1998

[87] PCT Pub. No.: WO97/42075

PCT Pub. Date: Nov. 13, 1997

[30] Foreign Application Priority Data

May 7, 1996 [JP] Japan .................................. 8-112855

[51] Int. Cl.$^7$ .............................. B63G 8/14; B63G 8/00; B63G 8/08; B05B 13/02
[52] U.S. Cl. .......................... 114/331; 114/330; 114/312; 114/338; 364/162
[58] Field of Search .................................. 114/330, 331, 114/332, 337; 701/21; 706/905, 23, 913; 364/148.03, 162

[56] References Cited

U.S. PATENT DOCUMENTS

| | | | |
|---|---|---|---|
| 2,969,033 | 1/1961 | Vacquier | 114/25 |
| 3,003,450 | 10/1961 | Brand et al. | 114/25 |
| 3,635,183 | 1/1972 | Keatinge | 116/16 R |
| 3,807,341 | 4/1974 | Miller | 114/235 B |
| 4,226,205 | 10/1980 | Bastide | 114/337 |
| 5,014,219 | 5/1991 | White | 364/513 |
| 5,488,589 | 1/1996 | DeAngelis | 367/131 |

FOREIGN PATENT DOCUMENTS

| | | | |
|---|---|---|---|
| 05134710A | 7/1991 | Japan | G05B 13/02 |
| 07187072A | 7/1996 | Japan | B23G 8/42 |

Primary Examiner—D. Glenn Dayoan
Assistant Examiner—Patrick Muldoon
Attorney, Agent, or Firm—Pearne, Gordon, McCoy & Granger LLP

[57] ABSTRACT

A submersible unit having thrusters for changing a diving position based on a total work quantity, which is the sum of a first work quantity and a second work quantity. A proportional controller generates and outputs the first work quantity based on a difference between a position quantity indicating a desired target diving position and a diving position. A network controller uses a neural network data processing system to learn movement characteristics of the submersible unit based on the first work quantity and a diving position sampled over a plurality of times. The network controller generates a second work quantity using control coupling coefficients learned by minimizing an evaluation quantity determined from a difference between the learned movement characteristics and target movement characteristic values.

20 Claims, 6 Drawing Sheets

SUBMERSIBLE UNIT AND DIVING POSITION CONTROL METHOD THEREFOR

TECHNICAL FIELD

The present invention relates to a submersible unit and a method for controlling the diving position of such an unit, and especially relates to techniques for holding constant the diving position of a submersible unit with respect to non-periodic external disturbances.

BACKGROUND ART

Japanese Patent Application, First Publication No. Hei 7-187072 discloses art relating to an automatic control method for a submersible unit using neural networks. This automatic control method for a submersible unit absorbs the effects of periodic external forces (external disturbances to the positional control of the submersible unit) such as waves by using learning control employing conventionally used proportional-plus-integral-plus-derivative control (PID control) and neural networks, thereby holding the diving position of the submersible unit constant even when periodic external forces are applied. That is, according to this automatic control method, the frequencies of periodic disturbances due to waves and the like are learned, an oscillator network is provided for outputting a sine wave signal of a standard frequency based on the learned frequency, and a neural controller controls the depth of the submersible unit based on the output of the oscillator network.

However, although the above-described automatic control method for a submersible unit is capable of holding the depth constant by absorbing the effects of periodic external disturbances acting on the submersible unit based on a sine wave output from an oscillator network, it is not capable of holding the depth sufficiently constant with respect to non-periodic external disturbances.

DISCLOSURE OF THE INVENTION

The present invention has been achieved in consideration of the above-mentioned problems, and has the object of offering a submersible unit and diving position control method capable of holding the diving position of the submersible unit constant with respect to non-periodic external disturbances.

The present invention relating to a submersible unit comprises propulsion means for changing a diving position based on a total work quantity which is the sum of a first work quantity and a second work quantity; proportional control means for generating and outputting said first work quantity based on a difference between position quantities indicating a target diving position and a diving position; and network control means which uses a neural network data processing system for learning movement characteristics of a diving position based on said first work quantity and a diving position sampled over a plurality of times, for learning to minimize an evaluation quantity determined from a difference between said movement characteristics and target movement characteristic values, and setting and outputting a second work quantity based on said movement characteristics.

In the present invention constructed in this manner, the propulsion means is driven based on a total work quantity obtained by adding a first work quantity output from the proportional control means and a second work quantity output from the network control means. In this case, the network control means using a neural network data processing system learns the movement characteristics of the submersible unit based on the first work quantity and diving positions of the submersible unit sampled over a plurality of times, and after that learning is completed, learns to minimize an evaluation quantity comprising the difference between the learned movement characteristics and the target movement characteristic values for setting the second work quantity, which is output to the propulsion means.

By employing this type of structure, the present invention is capable of holding the diving position of the submersible unit constant with respect to non-periodic external disturbances such as waves.

The present invention relating to another submersible unit comprises an adder for adding a first work quantity and a second work quantity and outputting a total work quantity; propulsion means for changing a diving position based on said total work quantity; position detection means for detecting said diving position and outputting a position quantity; target position setting means for setting and outputting a target diving position value; target movement value setting mans for setting and outputting a target change velocity value and a target change acceleration value for the diving position; a subtracter for subtracting said position quantity from target position value and outputting a position error quantity; proportional control means for performing a proportional-plus-integral-plus-derivative operation on said position error quantity and outputting said first work quantity; first network control means which uses a neural network data processing system, for receiving as inputs a current position change quantity which is said target position value subtracted from said position quantity for a current time, a past position change quantity which is said target position value subtracted from said position quantity for a past time, and said total work quantity, for multiplying predetermined estimated coupling coefficients with the inputs and outputting an estimated change velocity and estimated change acceleration of the diving position for a future time, for learning settings of said estimated coupling coefficients by minimizing evaluation quantities comprising a difference between said estimated change velocity and a change velocity of the diving position for a current time, and a difference between said estimated change acceleration and a change acceleration of the diving position for a current time, and for outputting error signals comprising a difference between a change velocity of the diving position determined from said position quantity and said target change velocity value, and a difference between a change acceleration of the diving position determined from said position quantity and a target change acceleration value; and second network control means which uses a neural network data processing system, for receiving as inputs said change velocity for a current time and a past time, for outputting said second work quantity by multiplying a predetermined control coupling coefficient with each of said inputs, and learning settings of said control coupling coefficient by minimizing said error signal.

In the present invention constructed in this manner, the adder adds the first work quantity and the second work quantity, and outputs a total work quantity. The propulsion means changes the diving position of the submersible unit based on the total work quantity input from the adder. The position detection means detects the diving position of the submersible unit and outputs a position quantity. The target position value setting means sets and outputs the target diving position value.

The target movement value setting means sets and outputs the target change velocity and the target change acceleration of the diving position. The subtracter subtracts the position quantity detected by the position detection means from the target position value set by the target position value setting means, and outputs a position error quantity. The proportional control means performs a proportional-plus-integral-plus-derivative operation on the position error quantity input from the subtracter, and outputs a first work quantity.

The first network control means uses a neural network data processing system, receives as inputs a current position change quantity which is obtained by subtracting the target position value set by the target position value setting means from the position quantity for a current time detected by the position detection means, a past position change quantity of a past time which is obtained by delaying the current position change quantity, and a total work quantity input from the adder, multiplies predetermined estimated coupling coefficients with the inputs and outputs an estimated change velocity and estimated change acceleration of the diving position for a future time, learns settings of the estimated coupling coefficients by minimizing evaluation quantities comprising a difference between the estimated change velocity and a change velocity of the diving position for a current time obtained by differentiating position quantities detected by the position detection means, and a difference between the estimated change acceleration and a change acceleration of the diving position for a current time obtained by differentiating the change velocity, and outputs error signals comprising a difference between a change velocity of the diving position obtained by differentiating the position quantity after the learning and the target change velocity value set by the target movement value setting means, and a difference between a change acceleration of the diving position obtained by differentiating the change velocity and the target change acceleration value set by the target movement value setting means.

The second network control means uses a neural network data processing system, receives as inputs the change velocity for a current time and a past time obtained by differentiating the position quantity detected by the position detection means, outputs the second work quantity by multiplying a predetermined control coupling coefficient with each of the inputs, and learns settings of the control coupling coefficient by minimizing the error signal.

On the other hand, the present invention relating to a diving position control method for a submersible unit, comprises steps of learning movement characteristics of a submersible unit while the submersible unit is proportionally controlled based on a first work quantity generated from a difference between an actual diving position and a target diving position value, based on differences between said first work quantity and said target position value, and diving positions sampled over a plurality of times; generating an error signal comprising a difference between said movement characteristics and target values of said movement characteristics; and generating a second work quantity based on said movement characteristics for addition to said first work quantity, and learning to generate the second work quantity based on said movement characteristics such as to minimize said error signal.

By employing a diving position control method of this type, it is possible to hold the diving position of a submersible unit constant with respect to non-periodic external disturbances such as waves.

Additionally, the present invention relating to another diving position control method for a submersible unit comprises steps of learning movement characteristics of a submersible unit while the submersible unit is proportionally controlled based on a first work quantity generated from a difference between an actual diving position and a target diving position value, based on differences in diving positions sampled with respect to said first work quantity and said target position value for a current time, a first past time which is a predetermined unit time period earlier than said current time, and a second past time which is said predetermined unit time period earlier than said first past time; generating an error signal comprising a difference between a change velocity of the diving position and a target change velocity value with respect to said change velocity, and a difference between a change acceleration of the diving position and a target change acceleration value with respect to said change acceleration; and generating a second work quantity based on the change velocities for said current time, the first past time and the second past time for addition to said first work quantity, and learning to generate the second work quantity based on said movement characteristics such as to minimize said error signal.

By employing a diving position control method of this type, it is possible to hold the diving position of a submersible unit constant with respect to non-periodic external disturbances such as waves.

BRIEF DESCRIPTION OF THE DRAWINGS

The following drawings are supplemented to the explanation of the best modes for carrying out the invention described below in order to give a better understanding of the present invention. That is.

BEST MODES FOR CARRYING OUT THE INVENTION

Hereinbelow, the best mode for carrying out the present invention shall be explained with reference to the drawings. First, the outer structure of the submersible unit which is the subject of control in the present embodiment shall be described with reference to FIGS. 1A and 1B. In this drawing, reference numeral 1 denotes a submersible unit which navigates underwater in the ocean or the like, and is connected to a mother ship anchored on the ocean surface by means of a cable B. The submersible unit 1 is supplied with electrical power from the mother ship through the cable B and receives various types of command signals for underwater navigation. The submersible unit 1 performs various types of underwater work based on the electrical power and commands signals supplied from the mother ship in this manner.

Figure 1A:
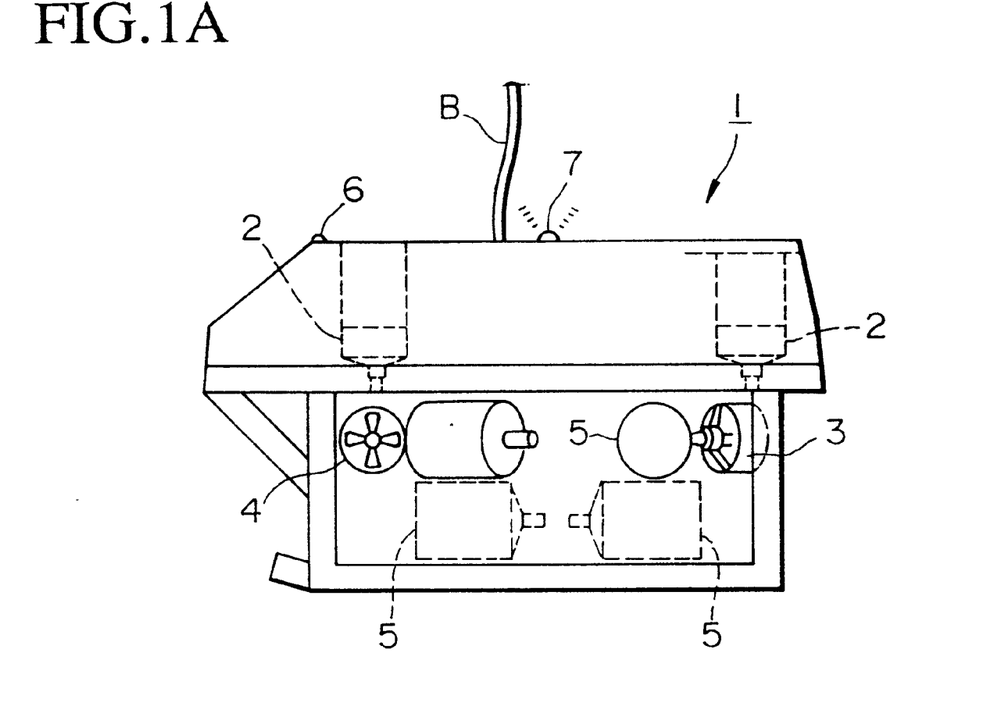
FIG. 1A is a side view showing an embodiment of a submersible unit in the submersible unit and diving position control method thereof according to the present invention.
Figure 1B:
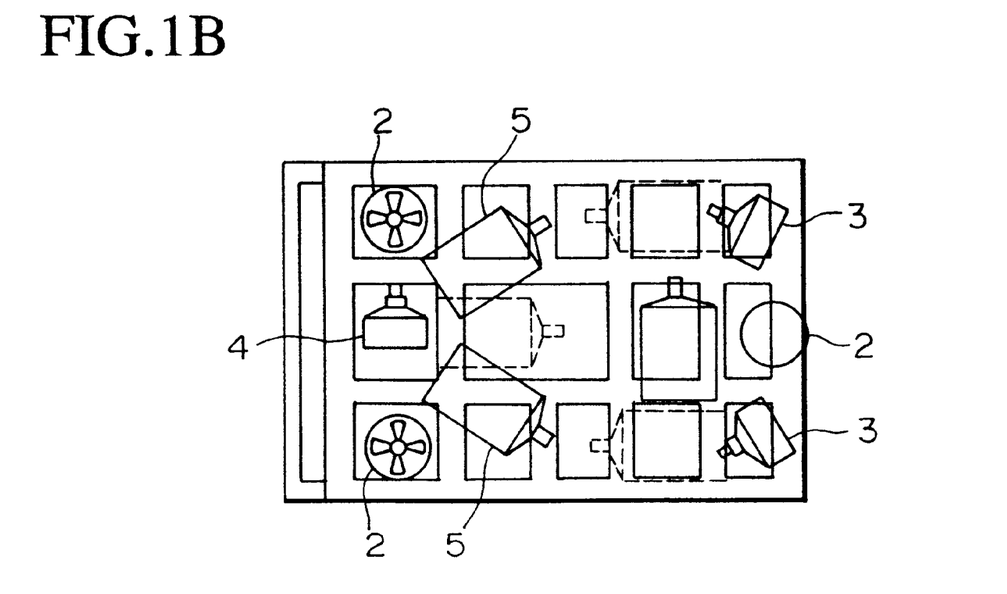
FIG. 1B is a plan view showing an embodiment of a submersible unit in the submersible unit and diving position control method thereof according to the present invention.

As a propulsion means for propelling the submersible unit 1, the submersible unit 1 is provided with three thrusters 2 for propelling the submersible unit in an up/down direction, i.e. in a depth direction, two thrusters 3 for propelling the submersible unit 1 in a forward/reverse direction, and one thruster 4 for turning the submersible unit in a left/right direction. Each of these thrusters 2, 3 and 4 is driven by a motor 5 capable of rotating both clockwise and counter-clockwise. Additionally, a depth sensor 6 for detecting the diving depth is provided at the front of an upper portion of the submersible unit 1, and a pinger 7 for generating sounds undersea is provided at the center of the upper portion. The mother ship detects the position of the diving unit 1 by measuring the sound generated by the pinger 7 at three points.

Additionally, the submersible unit 1 has a TV camera or the like, and sends work images taken by the TV camera to the mother ship via the cable B. In the mother ship, an operator outputs command signals to the submersible unit 1 relating to various types of undersea work based on the work images.

If, for example, a submersible unit 1 of this type of structure is working close to the ocean surface, non-periodic up/down movements or lateral sway in the forward/reverse and left/right directions due to the influence of ocean currents or undulations based on waves formed on the ocean surface can be applied to the submersible unit 1 as external disturbances.

Figure 2:
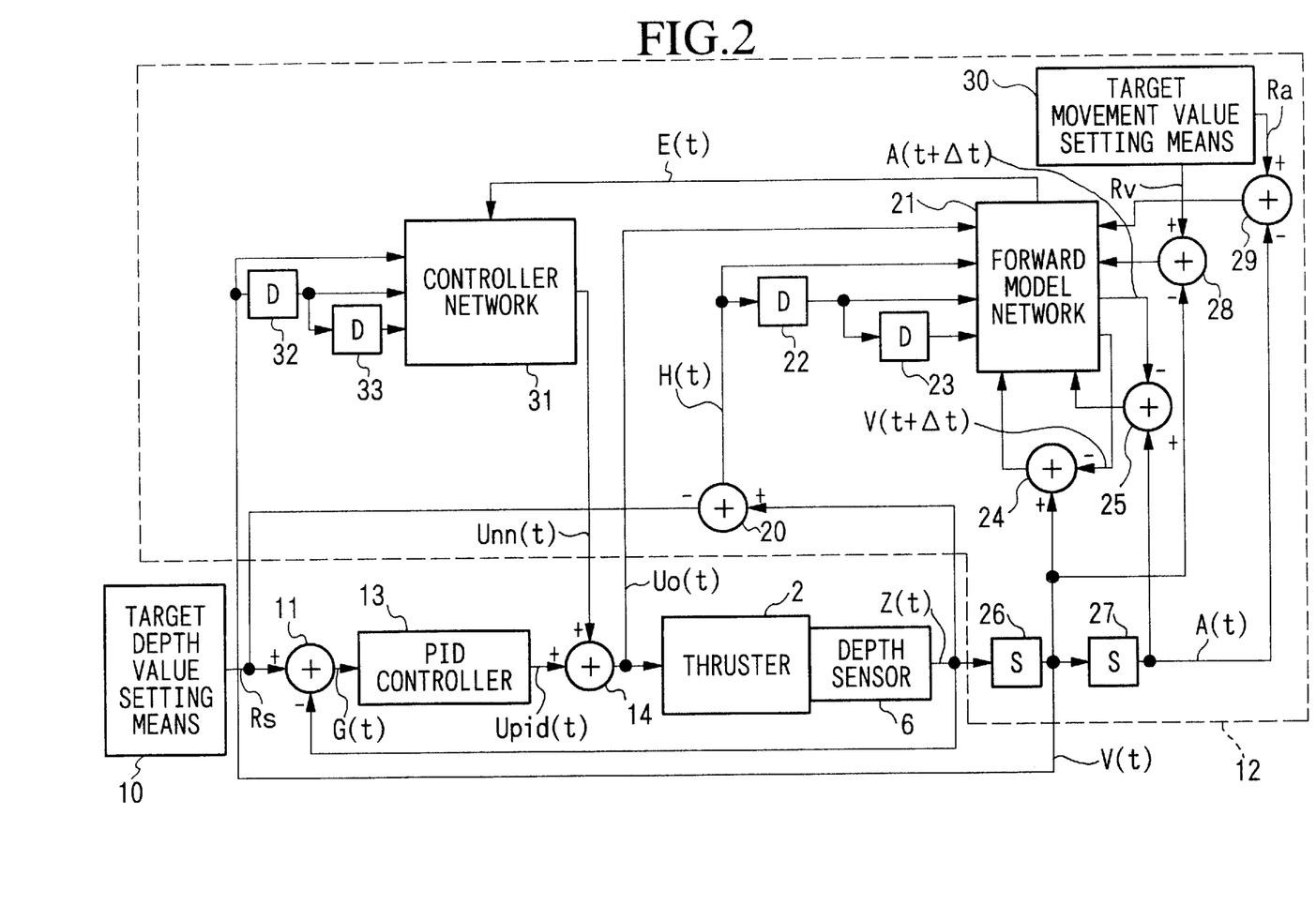
FIG. 2 is a block diagram showing an embodiment of a submersible unit and a diving position control method thereof according to the present invention.

Next, a control structure for the diving depth of the above-described submersible unit 1 shall be explained with reference to FIG. 2. In the drawing, reference numeral 10 denotes a target depth value setting means. This target depth value setting means 10 sets a target depth value $R_S$ which is a target value for the diving position of the submersible unit 1, and outputs this target depth value $R_S$ to a subtracter 11 and a network control means 12 to be described later. The subtracter 11 generates a depth error signal G(t) by subtracting a depth quantity (position quantity) Z(t) indicating the diving depth of the submersible unit 1 at time t, in other words the output of the depth sensor 6, from the target depth value $R_S$, and outputs this depth error signal G(t) to a PID controller (proportional control means) 13.

The PID controller 13 samples the depth error signal G(t) every predetermined unit period of time, and outputs a work quantity $U_{pid}(t)$ indicating a number of rotations of the motor 5 driving the thruster 2, in other words a first work quantity, based on the sampled value obtained by sampling, and outputs this sampled value to an adder 14. The adder 14 adds work quantity $U_{pid}(t)$ to a work quantity $U_{nn}(t)$ input from the network control means 12 to be described later, in other words a second work quantity, and outputs this addition value to the thruster 2 and the network control means 12 as a total work quantity $U_0(t)$.

The thruster 2 is driven based on this total work quantity $U_0(t)$ to change the diving depth of the submersible unit 1.

Simultaneously, the depth sensor 6 detects the change in diving depth of the submersible unit 1, and outputs the diving quantity Z(t) to the adder 11 and the network control means 12. The network control means 12 is a control means which performs neural network type information processing and determines input and output characteristics by standard learning.

Additionally, reference numeral 20 denotes a subtracter. This subtracter 20 subtracts the target depth value $R_S$ from the depth quantity Z(t) to calculate a current depth change quantity H(t), in other words a current position change quantity, which is output to a delay means (D) 22 and a forward model network 21 which is a first network control means. The delay means 22 outputs the current depth change quantity H(t) to the forward model network 21 and a delay means (D) 23 after a delay of a unit period of time Δt. The delay means 23 forwards the output of the delay means 22 to the forward model network 21 after a delay of a unit period of time Δt.

That is, the forward model network 21 receives as inputs the current depth change quantity H(t) of time t from the subtracter 20, and simultaneously a past depth change quantity H(t−Δt) of a time (t−Δt) which is a unit period of time Δt earlier than the current time t, in other words a first past time, from the delay means 22. Additionally, the forward model network 21 also receives as an input a past depth change quantity H(t−2Δt) of a time (t−2Δt) which is a unit period of time Δt earlier than the time (t−Δt), in other words a second past time, from the delay means 23.

Figure 3A:
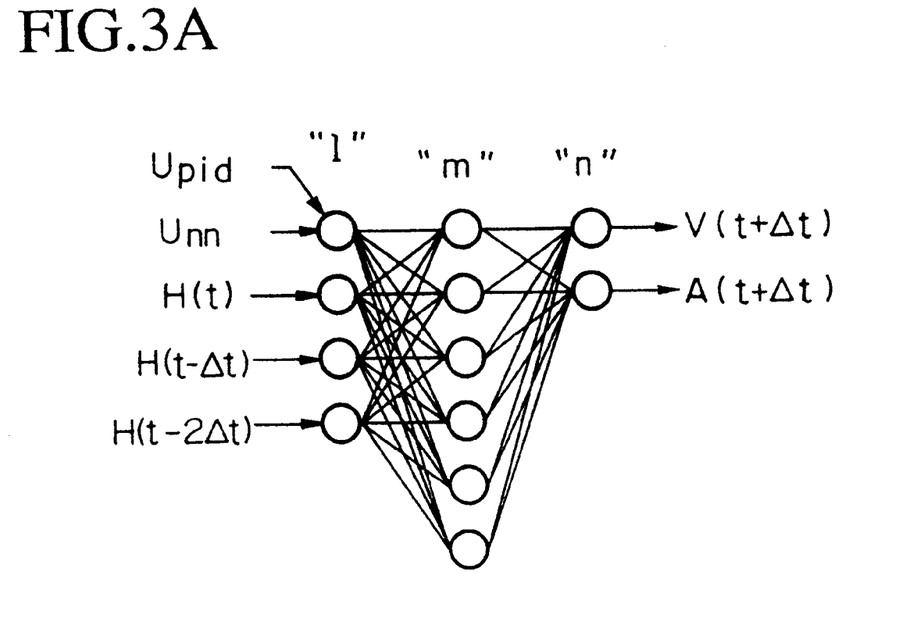
FIG. 3A is a structural diagram showing a forward model network according to an embodiment of a network control means in a submersible unit and a diving position control method thereof according to the present invention.

Next, the structure of the forward model network 21 shall be explained in detail with reference to FIG. 3A. As shown in this drawing, the forward model network 21 is a layered network composed of an input layer l, a middle layer m and an output layer n.

The input layer l is composed of four nodes, for example, of which the total work quantity $U_0$ is input into the first node, the current depth change quantity H(t) is input into the second node, the past depth change quantity H(t−Δt) is input into the third node, and the past depth change quantity H(t−2Δt) is input into the fourth node.

The middle layer m is composed of six nodes. The number of nodes in this middle layer m is set such as to enable the forward model network 21 to appropriately express the movement characteristics of the submersible unit 1. Each node in the middle layer m receives as inputs quantities obtained by multiplying a predetermined coupling coefficient, in other words an estimated coupling weight, with the total work quantity $U_0$, the current depth change quantity H(t), and the past depth change quantities H(t−Δt) and H(t−2Δt) input to the input layer l. Each node in the middle layer m processes a variable x obtained by summing the quantities input from each node in the input layer l using the threshold value function shown below, and outputs the results to the output layer n.

$$f(x)=1/\{1+\exp(-5x)\}-0.5 \quad (1)$$

The output layer n is composed of two nodes. The output of each node in the middle layer m multiplied by the predetermined coupling coefficient, in other words the estimated coupling weight, is input into each node in the output layer n. The first node in the output layer n applies the above-given threshold function (1) to a quantity obtained by summing the input quantities, and outputs to subtracter 24 an estimated quantity of the diving depth change velocity of the submersible unit 1 at a time (t+Δt) which is a unit period of time Δt after the current time t, in other words an estimated change velocity V(t+Δt). The second node of the output layer n applies the above-given threshold function (1) to a quantity obtained by summing the input quantities, and outputs to subtracter 24 an estimated quantity of the diving depth change acceleration of the submersible unit 1 at the time (t+Δt), in other words an estimated change acceleration A(t+Δt).

Reference numerals 26 and 27 denote differentiation means (S). The differentiation means 26 calculates a change velocity V(t) of the diving position of the submersible unit 1 at the current time t by differentiating the depth quantity Z(t), and outputs the change velocity V(t) to the differentiation means 27 and the subtracter 24 and subtracter 28 respectively. The differentiation means 27 calculates a change acceleration A(t) of the diving position of the submersible unit 1 by differentiating the change velocity V(t), and outputs the change acceleration A(t) to the subtracter 25 and the subtracter 29.

Here, the change velocity and change acceleration of the submersible unit 1 with regard to the diving depth are quantities expressing the movement characteristics of the submersible unit 1.

The subtracter 24 subtracts the estimated change velocity V(t+Δt) from the change velocity V(t) and outputs the result to the forward model network 21. The subtracter 25 subtracts the change acceleration A(t+Δt) from the change acceleration A(t), and outputs the result to the forward model network 21. Reference numeral 30 denotes a target movement value setting means which sets a target change velocity value $R_v$ of the diving depth which is output to the subtracter 28, and sets a target change acceleration value $R_a$ which is output to the subtracter 29.

The subtracter 28 subtracts the actual change velocity V(t) at the current time t from the target change velocity value $R_v$ of the submersible unit 1 at the diving depth, and outputs the result to the forward model network 21. The subtracter 29 subtracts the actual change acceleration A(t) at the current time t from the target change acceleration value $R_a$ of the submersible unit 1 at the diving depth, and outputs the result to the forward model network 21.

The outputs of the subtracters 24 and 25 are used by the forward model network 21 in order to learn the settings of the coupling coefficients. Additionally, the forward model network 21 calculates an error signal by using an error $E_1(t)$ determined by the following evaluation formula based on the outputs of the subtracters 28 and 29, and outputs the results to the controller network 31, in other words the second network control means.

$$E_1(t)=0.5\{(R_v-V(t))^2+(R_a-A(t))^2\} \tag{2}$$

The forward model network 21 learns the settings of the coupling coefficients in accordance with learning algorithms of a conventional reverse error propagation method.

Furthermore, the change velocity V(t) of the diving depth at current time t is input into the controller network 31 and the delay means (D) 32. The delay means 32 delays the change velocity V(t) by a unit period of time Δt and outputs the result to the controller network 31 and the delay means (D) 33. The delay means 33 delays the output of the delay means 32 by a unit period of time Δt and outputs the result to the controller network 31.

That is, the change velocity V(t) of the current time t is input from the differentiation means 26 to the controller network 31. Additionally, at the same time, a change velocity V(t−Δt) of a time (t−Δt) which is a unit period of time Δt prior to the current time t is input to the controller network 31 from the delay means 32, and a change velocity V(t−2Δt) of a time (t−2Δt) which is a unit period of time Δt prior to the time (t−Δt) is input to the controller network 31 from the delay means 33.

Figure 3B:
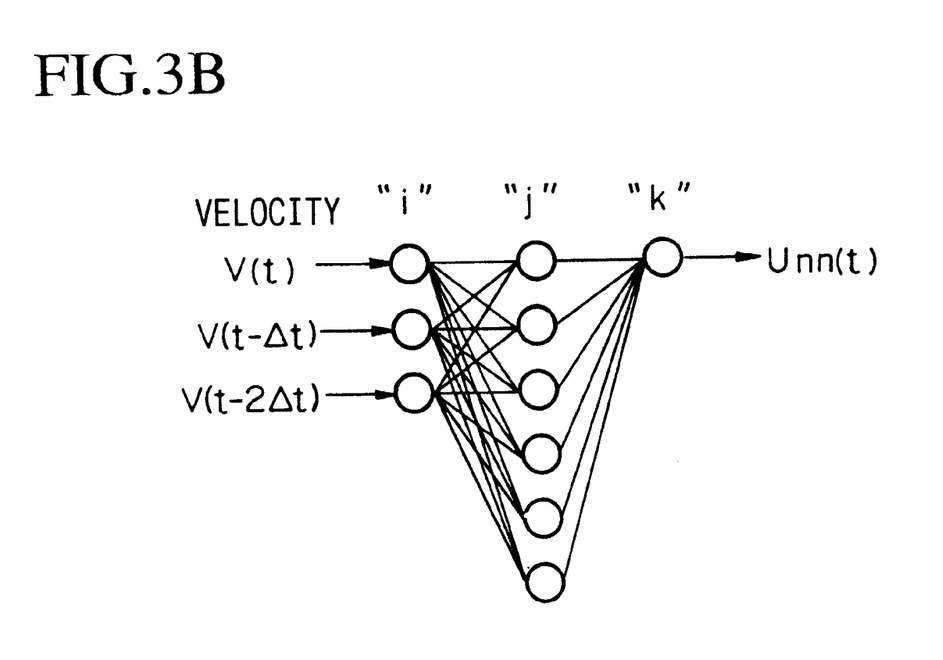
FIG. 3B is a structural diagram showing a controller network according to an embodiment of a network control means in a submersible unit and a diving position control method thereof according to the present invention.

Next, the structure of the controller network 31 shall be explained in detail with reference to FIG. 3B. As shown in this drawing, the controller network 31 is composed of an input layer i, a middle layer j and an output layer k which form a layered network having three layers. The input layer i is composed of three nodes, among which the change velocity V(t) is input into the first node, the change velocity V(t−Δt) is input into the second node, and the change velocity V(t−2Δt) is input into the third node; the outputs of all of the nodes in the input layer i are input into each node in the middle layer j.

The middle layer j is composed of six nodes. Each node in the middle layer j receives as inputs quantities obtained by multiplying a predetermined coupling coefficient with the change velocity V(t) of the current time t, the change velocity V(t−Δt) of a past time (t−Δt), and the change velocity V(t−2Δt) of a time further in the past (t−2Δt). Each node in the middle layer j processes a quantity obtained by summing the quantities input into the nodes using the above-given threshold value function (1), and outputs the results to the output layer k.

The output layer k is composed of a single node. The outputs of the respective nodes of the middle layer j, multiplied with predetermined coupling coefficients, in other words control coupling weights, are input into the node of the output layer k. The node of this output layer k generates the work quantity $U_{nn}$, in other words the second work quantity for the current time t, by applying the threshold value function (1) to the quantity obtained by summing the input quantities, and outputs this to the adder 14. The coupling coefficients in the controller network 31 are set by learning in accordance with learning algorithms of a conventional reverse error propagation method in the same manner as the forward model network 21.

Next, the diving position control operations for the submersible unit 1 having the above-described structure shall be explained in detail.

In this case, the coupling coefficients of the forward model network 21 and the controller network 31 are initially set at random and extremely small values. Therefore, the forward model network 21 does not output an error signal to the controller network 31 until the coupling coefficients are set to their optimum conditions after learning for a standard period of time. Additionally, since the coupling coefficients in the controller network 31 are also set at random and extremely small initial values, only an extremely small value is output as the work quantity $U_{nn}$ in the learning period of the forward model network 21.

Accordingly, when a random external disturbance such as a wave or the like is applied to the submersible unit 1, the thruster 2 is controlled exclusively by the PID controller 13 over a standard period of time from when control is initiated until the forward model network 21 has gained some level of learning.

Figure 4:
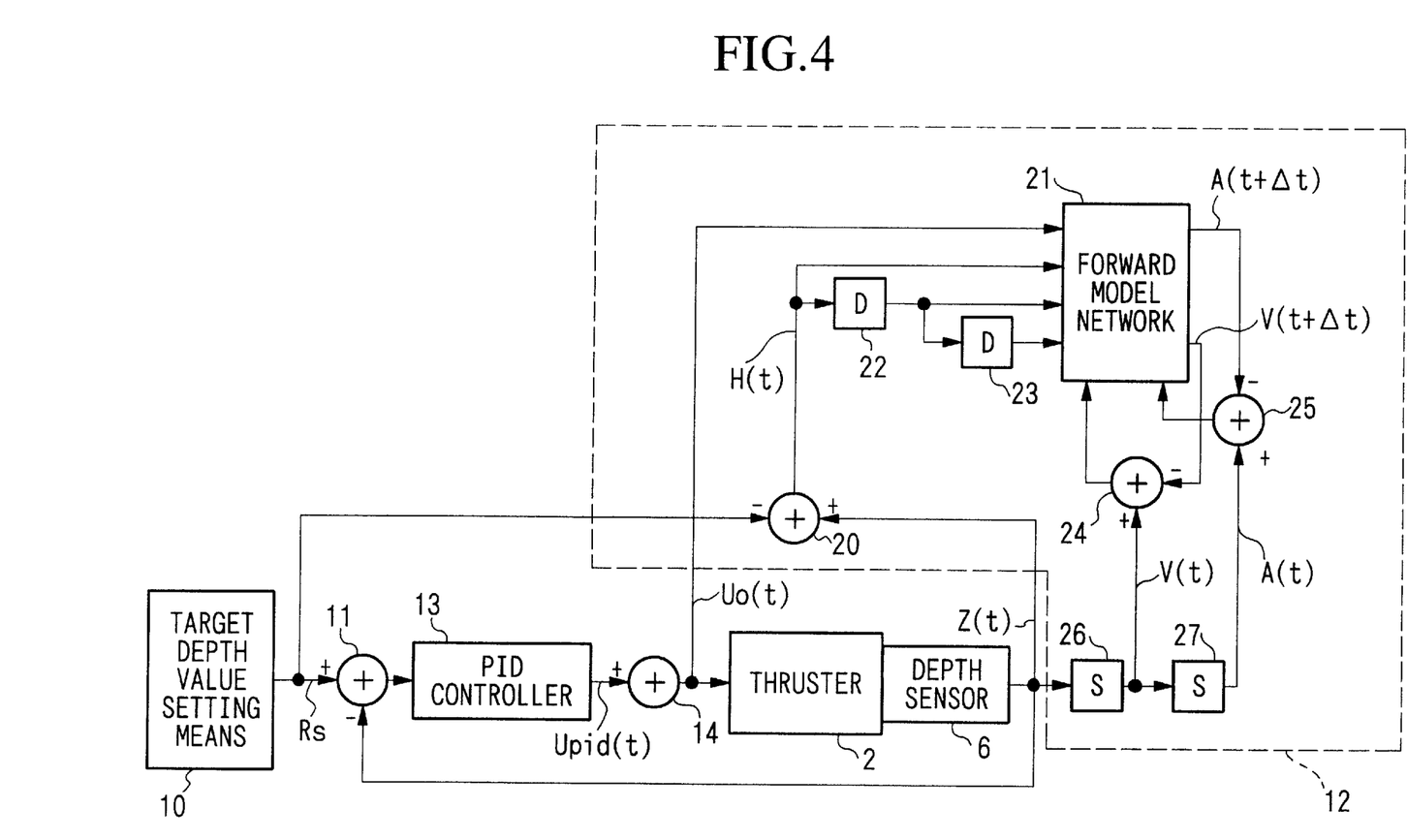
FIG. 4 is a block diagram showing a control system of a submersible unit during a learning period of a forward model network in a submersible unit and diving position control method thereof according to the present invention.

The control system of the submersible unit 1 during the learning period of the forward model network 21 is a control system such as shown in FIG. 4. Each coupling coefficient of the forward model network 21 during this period is learned such that the evaluation quantity $E_2(t)$ calculated by the following evaluation formula gives a minimum value, based on the values input from the subtracters 24, 25.

$$E_2(t)=0.5\{(V(t+\Delta t)-V(t))^2+(A(t+\Delta t)-A(t))^2\} \tag{3}$$

That is, in the depth direction, the coupling coefficients are learned and set by taking the minimum value of the difference between the actual change velocity V(t) of the submersible unit 1 at the current time t and the estimated change velocity V(t+Δt) for a time (t+Δt) which is a unit period of time Δt after the current time t, and the coupling coefficients are learned and set by taking the minimum value of the difference between the actual change acceleration A(t) of the submersible unit 1 at the current time t and the estimated change acceleration A(t+Δt) for a time (t+Δt) which is a unit period of time Δt after the current time t.

As a result, the estimated change velocity V(t+Δt) and the estimated change acceleration A(t+Δt) estimated and output by the forward model network 21 become close in value to the change velocity V(t) and change acceleration A(t) which express the actual movement characteristics of the submersible unit. Simultaneously, the forward model network 21 learns the movement characteristics of the submersible unit when a random external disturbance has been applied, thereby modeling the movement characteristics of the submersible unit 1.

As the coupling coefficients are gradually set to the optimum values due to this type of learning, the forward model network 21 begins to output the error signals to the controller network 31.

Figure 5:
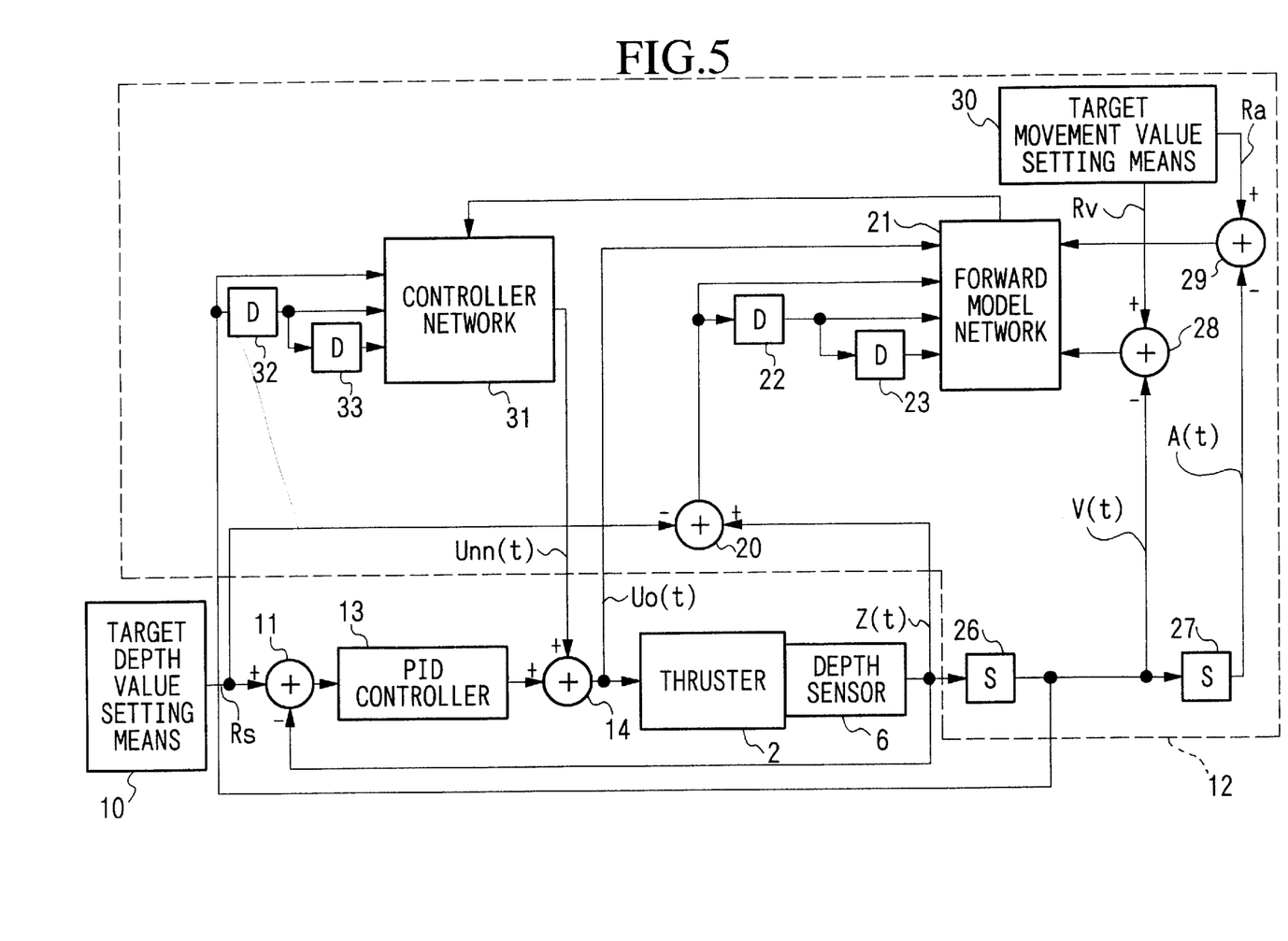
FIG. 5 is a block diagram showing a control system of a submersible unit after a learning period of a forward model network in a submersible unit and diving position control method thereof according to the present invention.

Next, after the forward model network 21 has completed learning, the diving position control system of the submersible unit 1 becomes as shown in FIG. 5. Hereinbelow, the diving position control operations of the submersible unit 1 in this state shall be explained in detail with reference to FIG. 5.

When error signals generated based on the errors $E_1(t)$ expressed by the above evaluation formula (2) are input from the forward model network 21, the coupling coefficients of the controller network 31 are learned by taking the minimum values for the errors $E_1(t)$. The learning period of the controller network 31 differs from the learning period of the forward model network in that the work quantity $U_{nn}(t)$ is applied to the adder 14 as a larger value as the learning progresses and the coupling coefficients are optimized. That is, during this learning period, the controller network 31 learns while controlling the thruster 2 based on the sum of the work quantity $U_{nn}(t)$ output from the controller network 31 and the work quantity output from the PID controller 13.

In this case, the coupling coefficients of the controller network 31 are learned and set such that the difference between the target change velocity value $R_v$ in the depth direction and the actual change velocity V(t) of the submersible unit 1 is a minimum value, and such that the target change acceleration value $R_a$ in the depth direction and the actual change acceleration A(t) is a minimum value.

As a result, the work quantity $U_{nn}(t)$ is set such that the change velocity V(t) which indicates the actual movement characteristics of the submersible is a value close to the target change velocity value $R_v$, and the change acceleration A(t) is a value close to the target acceleration value $R_a$, in other words such as to suppress depth changes of the submersible unit 1 based on the change velocities V(t), V(t−Δt) and V(t−2Δt) which indicate the actual movement characteristics of the submersible unit 1.

Figure 6:
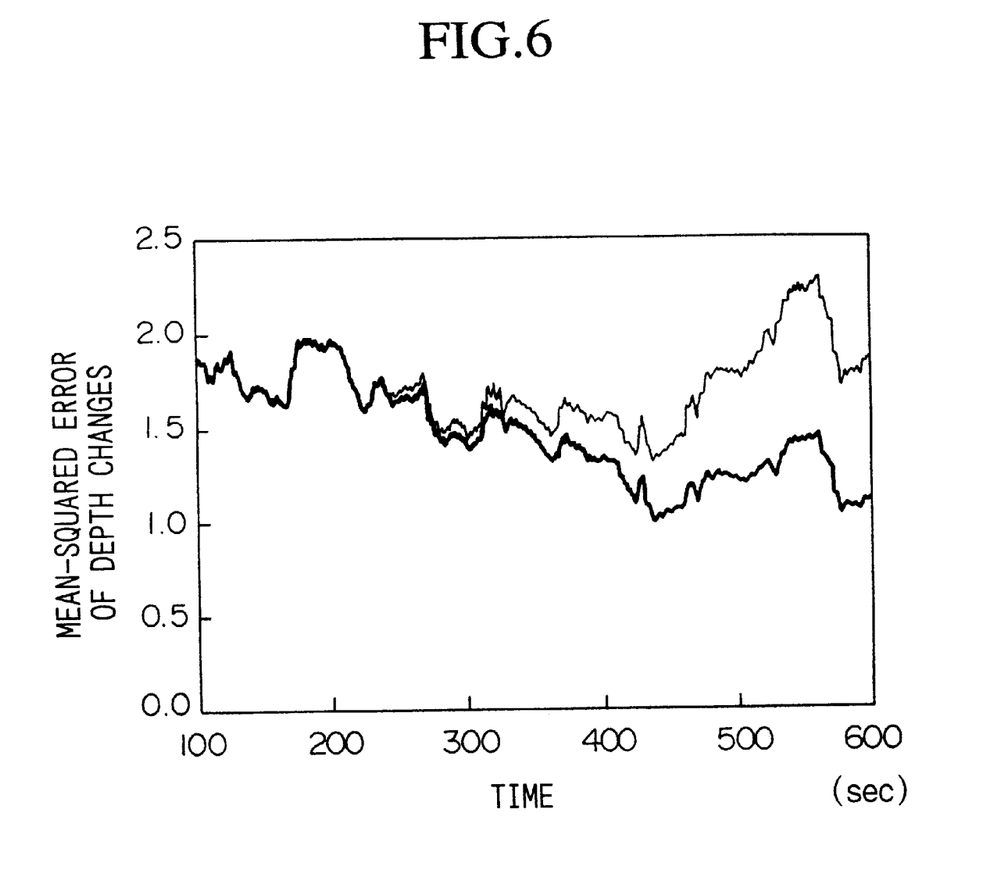
FIG. 6 is a diagram for explaining the functions of a network control means in a submersible unit and diving position control method thereof according to the present invention.

FIG. 6 is a graph showing the mean-squared error characteristics a of the depth change of the submersible unit 1 when the thruster 2 is controlled by the above-described network control means 12 and a PID controller 13, and the mean-squared error characteristics b when the thruster 2 is controlled by only a PID controller 13, shown with respect to the elapsed time from control initiation. As can be seen from this graph, there is almost no difference between the mean-squared error a and the mean-squared error b until 300 seconds after initiation, but as the network control means 12 begins to learn and outputs the work quantity $U_{nn}$, the mean-squared error characteristic a becomes to have a smaller value than the mean-squared error characteristic b, and the effects of the network control means 12 appear dramatically.

While the control of the diving depth of the submersible unit 1, in other words the control of the thruster 2 has been described for the purposes of the above embodiment, the above-described position control method can also be used to control the forward/reverse direction or the right/left direction, in other words to control thruster 3 or thruster 4, by detecting the position of the submersible unit 1 in the forward/reverse direction or in the right/left direction.

We claim:

1. A submersible unit, comprising:

propulsion means for changing a diving position based on a total work quantity which is the sum of a first work quantity and a second work quantity;

proportional control means for generating and outputting said first work quantity based on a difference between position quantities indicating a target diving position and a diving position; and network control means which uses a neural network data processing system for learning movement characteristics of said submersible unit based on said first work quantity and a diving position sampled over a plurality of times, for learning to minimize an evaluation quantity determined from a difference between said movement characteristics based on the speed of displacement of said diving position sampled over a plurality of times and target movement characteristic values, and outputting a second work quantity.

2. A submersible unit as recited in claim 1, wherein the movement characteristics are obtained by a change velocity and change acceleration of the diving position.

3. A submersible unit as recited in claim 2, wherein the network control means comprises a layered network composed of at least three layers.

4. A submersible unit as recited in claim 2, wherein the plurality of times include at least a current time, a first past time which is a predetermined unit time period earlier than said current time, and a second past time which is said predetermined unit time period earlier than said first past time.

5. A submersible unit as recited in claim 1, wherein the network control means comprises a layered network composed of at least three layers.

6. A submersible unit as recited in claim 5, wherein the plurality of times include at least a current time, a first past time which is a predetermined unit time period earlier than said current time, and a second past time which is said predetermined unit time period earlier than said first past time.

7. A submersible unit as recited in claim 1, wherein the plurality of times include at least a current time, a first past time which is a predetermined time period earlier than said current time, and a second past time which is said predetermined time period earlier than said first past time.

8. A submersible unit, comprising:

an adder for adding a first work quantity and a second work quantity and outputting a total work quantity;

propulsion means for changing a diving position based on said total work quantity;

position detection means for detecting said diving position and outputting a position quantity;

target position setting means for setting and outputting a target diving position value;

target movement value setting mans for setting and outputting a target change velocity value and a target change acceleration value for the diving position;

a subtracter for subtracting said position quantity from target position value and outputting a position error quantity;

proportional control means for performing a proportional-plus-integral-plus-derivative operation on said position error quantity and outputting said first work quantity;

first network control means which uses a neural network data processing system, for receiving as inputs a current position change quantity which is said target position value subtracted from said position quantity for a current time, a past position change quantity which is said target position value subtracted from said position quantity for a past time, and said total work quantity, for multiplying predetermined estimated coupling coefficients with the inputs and outputting an estimated change velocity and estimated change acceleration of the diving position for a future time, for learning settings of said estimated coupling coefficients by minimizing evaluation quantities comprising a difference between said estimated change velocity and a change velocity of the diving position for a current time, and a difference between said estimated change acceleration and a change acceleration of the diving position for a current time, and for outputting error signals comprising a difference between said target change velocity value and a change velocity of the diving position determined from said position quantity, and a difference between said target change acceleration value and a change acceleration of the diving position determined from said change velocity; and second network control means which uses a neural network data processing system, for receiving as inputs said change velocity for a current time and a past time, for outputting said second work quantity by multiplying a predetermined control coupling coefficient with each of said inputs, and learning settings of said control coupling coefficient by minimizing said error signal.

9. A submersible unit as recited in claim 8, wherein the diving position is a diving depth.

10. A diving position control method for a submersible unit, comprising steps of:

learning movement characteristics of a submersible unit while the submersible unit is proportionally controlled based on a first work quantity generated from a difference between an actual diving position and a target diving position value, based on differences between said first work quantity and said target position value, and diving positions sampled over a plurality of times;

generating an error signal comprising a difference between said movement characteristics and target values of said movement characteristics; and generating a second work quantity based on said movement characteristics for addition to said first work quantity, and learning to generate the second work quantity based on said movement characteristics such as to minimize said error signal.

11. A diving position control method for a submersible unit as recited in claim 10, wherein the movement characteristics are obtained by a change velocity and change acceleration of the diving position.

12. A position control method for a submersible unit as recited in claim 11, wherein the learning of the movement characteristics of the submersible unit and the learning of the generation of the second work quantity is performed by a data processing means based on neural networks.

13. A position control method for a submersible unit as recited in claim 12, wherein the diving position is a diving depth.

14. A position control method for a submersible unit as recited in claim 11, wherein the diving position is a diving depth.

15. A position control method for a submersible unit as recited in claim 10, wherein the learning of the movement characteristics of the submersible unit and the learning of the generation of the second work quantity is performed by a data processing means based on neural networks.

16. A position control method for a submersible unit as recited in claim 15, wherein the diving position is a diving depth.

17. A position control method for a submersible unit as recited in claim 10, wherein the diving position is a diving depth.

18. A diving position control method for a submersible unit, comprising steps of:

learning movement characteristics of a submersible unit while the submersible unit is proportionally controlled based on a first work quantity generated from a difference between an actual diving position and a target diving position value, based on differences in diving positions sampled with respect to said first work quantity and said target position value for a current time, a first past time which is a predetermined unit time period earlier than said current time, and a second past time which is said predetermined unit time period earlier than said first past time;

generating an error signal comprising a difference between a change velocity of the diving position and a target change velocity value with respect to said change velocity, and a difference between a change acceleration of the diving position and a target change acceleration value with respect to said change acceleration; and generating a second work quantity based on the change velocities for said current time, the first past time and the second past time for addition to said first work quantity, and learning to generate the second work quantity based on said movement characteristics such as to minimize said error signal.

19. A position control method for a submersible unit as recited in claim 18, wherein the learning of the movement characteristics of the submersible unit and the learning of the generation of the second work quantity is performed by a data processing means based on neural networks.

20. A position control method for a submersible unit as recited in claim 18, wherein the diving position is a diving depth.

* * * * *